Patented Nov. 20, 1934

1,981,102

UNITED STATES PATENT OFFICE 1,981,102

PHOTOGRAPHIC MATERIAL AND PROCESS OF MAKING THE SAME

Max Hagedorn and Gerhard von Kujawa, Dessau in Anhalt, Germany, assignors to Agfa Ansco Corporation, Binghamton, N. Y., a corporation of New York No Drawing. Application August 14, 1933, Serial No. 685,147. In Germany August 10, 1932

11 Claims. (Cl. 95—7)

Our present invention relates to a photographic material and more particularly to a light sensitive material which is adapted for the most various purposes occurring in photography.

One of its objects is to provide a process for the manufacture of light sensitive layers. Another object is the new light sensitive layers. Further objects will be seen from the detailed specification following hereafter.

We have found that polyacrylic acid and the salts thereof or other polymeric carboxylic acids and the mixed polymerization products of these acids and their salts are well suited to be used instead of, for instance, gelatin for the preparation of photographic layers of all kinds. Such polymeric acids are, for instance, polymethylene-malonic acid, polymaleic acid, the polymerization product from a mixture of styrol and acrylic acid, from a mixture of acrylic acid nitrile and acrylic acid, from a mixture of acrylic acid nitrile, acrylic acid ethyl ester and acrylic acid, from a mixture of styrol and maleic acid, or a mixture from vinylmethylether and methylene maleic acid. The salts of these acids which enter into consideration for the purpose of the invention are the inorganic and organic salts, for instance, the sodium salt, the potassium salt, the lead salt, the mercury salt, or the salt obtainable by the reaction between triethanolamine and the required acid. As to the degree of polymerization of the product, care should be taken that it is not too high, since the product would then lose its capacity of swelling in water which is indispensable for photographic layers. Therefore the polymerization should not proceed farther than to a k-value of about 110 (cf. Cellulose Chemie 1932, pages 60 to 61).

The material is made into photographic layers in a manner analogous to that according to which gelatin is worked up for this purpose and which will be more clearly seen from the examples. The material is dissolved in water if required by the addition of ammonia and the light-sensitive material incorporated therein. The solution thus prepared is cast on a support and dried. If required our new binding agent may be used in admixture with other binding agents, for instance, gelatin, casein and the like. As a support there may be used a glass plate, a metal plate, a film made of a cellulose derivative, paper, a web and the like. However, there may also be prepared light sensitive sheets without any carrier in the manner known in the art. The light sensitive component can also be incorporated in the finished sheets by imbibition. The casting solution is preferably given a viscosity equal to that of a usual gelatin solution of 4 to 5 per cent strength. The viscosity may be regulated by suitably selecting the concentration of the casting solution.

The nature of the binding material for the light sensitive substances permits variation of the mechanical properties of the light sensitive layers within wide limits and improvement of such layers as compared with gelatin layers. The said nature also permits application of quite a number of methods for the after-treatment of the finished light sensitive layers. Thus, for instance, the layers may be hardened not only by the well known treatment with formaldehyde or with chromic alum, but also, if the polymeric substance is a free acid, by formation of a suitable salt from the acid, the effect being different in respect of the solubility and the surface hardness of the layer. In a similar way the formation of salts permits change to a large extent of the sensitiveness of the surface towards pressure or mechanical deterioration as well as the hydrophile character and the smoothness of the surface. Furthermore it is possible, by the formation of dyestuff salts, for instance, with methylene blue, to modify the transparency of the layer for rays of various wave lengths.

When exposing the layer under a suitable negative, for instance, a half-tone or a screen negative, the binding agent is hardened in a relief-like gradation, so that the layer, by means of cold or warm water, may be developed into a swelling or wash-out relief.

If desired the developed relief may subsequently be hardened by means of a solution of calcium or magnesium salts, whereby the binding agent is transformed into the water-insoluble calcium or magnesium salt of the polycarboxylic acid.

The relief produced in the manner described may directly be used, in the same way as a corresponding gelatin relief, for an etching resist or as a flat printing form or a relief printing form, or for the preparation of a printing block by moulding a relief.

The following examples illustrate the invention:

*Example 1.*—5 cc. of an aqueous solution of 8 per cent strength of polyacrylic acid are mixed with 4 cc. of a solution of potassium bichromate of 10 per cent strength which has been neutralized with ammonia and diluted with 20 cc. of water. The solution is applied on to a zinc plate, the surplus of solution is removed by centrifuging, and after drying the plate is exposed under a negative for line or screen work. Then the plate is developed with cold water and is hardened with a solution of magnesium chloride. The wash-out relief serves as an etching resist for the etching of the zinc plate which is then performed.

*Example 2.*—5 cc. of an aqueous solution of 8 per cent strength of polyacrylic acid are mixed with 20 cc. of an aqueous solution of triethanolamine of 5 per cent strength and to the mixture there are added 4 cc. of a solution of potassium bichromate of 10 per cent strength which has been neutralized with ammonia. If desired there may further be added 2 cc. of an aqueous solution of gelatin of 10 per cent strength. This solution is poured on to a glass plate and exposed under a negative for black and white or half-tone work. After exposure the exposed layer is swollen in a solution of calcium chloride of 1 per cent strength, washed with water and may now be dyed with dyestuffs. The picture obtained is a negative of the pattern employed.

If swelling is produced by means of a solution of calcium chloride of a higher concentration, there will be obtained, in case of a short exposure, a positive picture of the pattern employed.

*Example 3.*—42 grams of ammonium bromide and 2.3 grams of potassium iodide are dissolved in 400 cc. of a solution of the sodium salt of the polymerization product from a mixture of styrol and maleic acid, the concentration of which varies, according to the viscosity of the product between 4 and 8 per cent, so that its viscosity corresponds approximately with that of a solution of gelatin of 4 to 5 per cent strength, and to this solution there is added, while maintaining a temperature of between 55 and 65° C. and stirring, a solution consisting of 60 grams of silver nitrate and 500 cc. of water within the course of 10 to 30 minutes according to the sensitiveness desired. If desired the solution of a ripening substance may be added. The emulsion obtained is run, while stirring, in an equal volume of a solution of calcium nitrate of 5 per cent strength and the product precipitated, after dividing it into small pieces, is washed in the usual way.

This product is then mixed, while stirring, with about 800 cc. of a gelatin solution of 3 to 4 per cent strength. The calcium salt of the above polymerization product is passed into solution by the addition of an exactly sufficient amount of ammonia, after-ripened in the usual way, caused to solidify, washed and cast on to a support.

*Example 4.*—In a solution of 400 cc. of polyacrylic acid of 4 to 8 per cent strength (the concentration of the solution being thus selected that its viscosity corresponds approximately with that of solution of gelatin of 4 to 5 per cent strength) there are dissolved 42 grams of ammonium bromide and 2.3 grams of potassium iodide. Into this mixture which is heated to 55 to 65° C. there is run a solution of 60 grams of silver nitrate in 500 cc. of water in the course of 10 to 30 minutes according to the required sensitiveness of the finished photographic material. If required, a ripening substance may be added. The emulsion obtained is added, while stirring, to the same volume of a solution of calcium nitrate of about 5 per cent strength. The precipitated product is reduced to small pieces and washed with water.

The product obtained is added to 800 cc. of a gelatin solution of 3 to 4 per cent strength and the calcium salt of the polyacrylic acid is dissolved by the addition of exactly the necessary quantity of ammonia. The solution is after-ripened in the usual manner, solidified, washed and cast.

*Example 5.*—To 65 cc. of a solution of polyacrylic acid of 3 per cent strength there are first added 25 cc. of a solution of ferri-ammonium citrate of 10 per cent strength and then 20 cc. of a solution of potassium-ferricyanide of 10 per cent strength. The mixture is cast in the usual manner on a prepared glass plate and quickly dried.

When exposing the layer thus obtained there will be obtained a blue iron picture which is stabilized by bathing the same several times in a solution of calcium nitrate of 5 to 10 per cent strength and then treating it with dilute hydrochloric acid.

*Example 6.*—12 to 25 grams of the polymerization product from a mixture of acrylic acid, styrol and butyl acrylate (according to the degree of polymerization) are suspended in 400 cc. of water and brought to dissolution by the addition of ammonia so that there is present in the finished solution at most a slight excess of ammonia and that the viscosity of the solution corresponds approximately to that of a solution of gelatin of 4 to 5 per cent strength as usually employed for the manufacture of photographic emulsions. In this mixture there are dissolved 42 grams of ammonium bromide and 2.3 grams of potassium iodide. To this mixture there is added at a temperature of 55 to 65° C. a solution of 60 grams of silver nitrate in 500 cc. of water in the course of 10 to 20 minutes according to the required sensitiveness. The emulsion is precipitated by the addition of dilute acetic acid in a slight excess and the precipitate reduced to small pieces and washed.

The further working up is as described in Example 3.

Instead of the polymerization product above indicated there may also be used the polymerization product from a mixture of maleic acid anhydride and vinylmethylether or another polymeric carboxylic acid or mixed polymerization product.

What we claim is:

1. A process of manufacturing a light-sensitive layer which comprises dissolving a compound selected from the group consisting of artificial polymeric carboxylic acids containing in their molecule a methylene group and their salts in water, adding to this solution a light-sensitive material and casting this solution to form a layer.

2. A process of manufacturing a light-sensitive layer which comprises dissolving a compound selected from the group consisting of artificial polymeric carboxylic acids containing in their molecule a methylene group and their salts in water, adding to this solution a light-sensitive material, precipitating the emulsion, washing the precipitate, dissolving the precipitate, and casting this solution to form a layer.

3. A process of manufacturing a light-sensitive layer which comprises dissolving a compound selected from the group consisting of artificial polymeric carboxylic acids containing in their molecule a methylene group and their salts in water, adding to this solution a light-sensitive material, precipitating the emulsion, washing the precipitate, dissolving the precipitate in the solution of another binding agent, and casting this solution to form a layer.

4. A photographic material which comprises a light-sensitive layer comprising a light-sensitive material and a compound selected from the group consisting of artificial polymeric carboxylic acids containing in their molecule a methylene group and their salts.

5. A photographic material which comprises a light-sensitive layer comprising a light-sensitive material, gelatin and a compound selected from the group consisting of artificial polymeric carboxylic acids containing in their molecule a methylene group and their salts.

6. A photographic material which comprises a light-sensitive layer comprising the ammonium salt of polyacrylic acid, and potassium bichromate.

7. A photographic material which comprises a light-sensitive layer comprising the ammonium salt of the polymerization product from a mixture of styrol and maleic acid, and silver halide.

8. A photographic material which comprises a light-sensitive layer comprising the polymerization product from acrylic acid, styrol and butyl acrylate, and silver halide.

9. A process of manufacturing a light sensitive layer which comprises neutralizing a solution of potassium bichromate with ammonia, mixing this solution with a solution of polyacrylic acid, and casting a layer from this solution.

10. A process of manufacturing a light sensitive layer which comprises dissolving ammonium bromide and potassium iodide in a solution of the sodium salt of the polymerization product from a mixture of styrol and maleic acid, heating said solution to about 55° to 65° C., adding a solution of silver nitrate while stirring, running the solution obtained in a solution of calcium nitrate, washing the resulting precipitate, adding the precipitate to a solution of gelatin, adding to the mixture ammonia until the calcium salt of the polymerization product is dissolved, ripening the emulsion, and casting a layer from the ripened emulsion.

11. A process of manufacturing a light sensitive layer which comprises suspending the polymerization product from a mixture of acrylic acid, styrol and butyl acrylate, adding ammonia until dissolution occurs, dissolving in this solution ammonium bromide and potassium iodide, heating the solution to 55 to 65° C., adding a solution of silver nitrate, precipitating the emulsion by the addition of a slight excess of acetic acid, washing the precipitate, adding the precipitate to a solution of gelatin, adding ammonia until dissolution occurs, ripening the emulsion, and casting a layer from the ripened emulsion.

MAX HAGEDORN.
GERHARD v. KUJAWA.